United States Patent
Umarov et al.

(10) Patent No.: US 9,827,495 B2
(45) Date of Patent: Nov. 28, 2017

(54) SIMULATION DEVICE, SIMULATION METHOD, PROGRAM, AND INFORMATION STORAGE MEDIUM

(71) Applicant: KONAMI DIGITAL ENTERTAINMENT CO., LTD., Tokyo (JP)

(72) Inventors: Iskander Umarov, Tokyo (JP); Eiji Suzuki, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 119 days.

(21) Appl. No.: 15/021,272

(22) PCT Filed: Jun. 23, 2014

(86) PCT No.: PCT/JP2014/066559
§ 371 (c)(1),
(2) Date: Mar. 11, 2016

(87) PCT Pub. No.: WO2015/037303
PCT Pub. Date: Mar. 19, 2015

(65) Prior Publication Data
US 2016/0220906 A1 Aug. 4, 2016

(30) Foreign Application Priority Data

Sep. 12, 2013 (JP) ................................ 2013-189558

(51) Int. Cl.
*A63F 13/65* (2014.01)
*A63F 13/56* (2014.01)
*A63F 13/812* (2014.01)

(52) U.S. Cl.
CPC .............. *A63F 13/56* (2014.09); *A63F 13/65* (2014.09); *A63F 13/812* (2014.09); *A63F 2300/306* (2013.01)

(58) Field of Classification Search
CPC ......... A63F 13/56; A63F 13/65; A63F 13/812
See application file for complete search history.

(56) References Cited

U.S. PATENT DOCUMENTS

2009/0091583 A1* 4/2009 McCoy .................. A63F 13/02
345/633
2010/0160038 A1* 6/2010 Youm ..................... A63F 13/10
463/29

(Continued)

FOREIGN PATENT DOCUMENTS

JP  2010-022493 A  2/2010

*Primary Examiner* — Corbett B Coburn
(74) *Attorney, Agent, or Firm* — Hubbs, Enatsky & Inoue PLLC

(57) ABSTRACT

First control means of a simulation device simulates motions of a plurality of virtual players that are placed in a virtual world and other than an operation target of a user. Determining means determines whether a situation of a game being simulated in the virtual world is similar to a situation indicated in data. In a case where it is determined that the situation of the game in the virtual world is similar to the situation indicated in the data, second control means controls, in place of the first control means, the virtual players other than the operation target of the user based on a motion associated with the situation.

15 Claims, 9 Drawing Sheets

(56) References Cited

U.S. PATENT DOCUMENTS

| | | | |
|---|---|---|---|
| 2011/0124386 A1 | 5/2011 | Kondo et al. | |
| 2011/0275432 A1* | 11/2011 | Lutnick | G07F 17/3232 |
| | | | 463/25 |
| 2013/0324239 A1* | 12/2013 | Ur | A63F 13/57 |
| | | | 463/31 |
| 2014/0004950 A1* | 1/2014 | Szufnara | A63F 13/10 |
| | | | 463/42 |

* cited by examiner

FIG.4

| SCENARIO NO. | SITUATION AND MOTION ||||||||| |
|---|---|---|---|---|---|---|---|---|---|
| | BALL ||| PLAYER ||||| GAME ||
| | POSITION | DIRECTION MOVING VELOCITY | NAME | POSITION | DIRECTION | MOVING VELOCITY | POSE | ACTION | STATE | TIME | SCORE |
| 1 | $(X_1,Y_1,Z_1)$ | $S_1$ | A | $(X_{A1},Y_{A1},Z_{A1})$ | $V_{A1}$ | $S_{A1}$ | $P_{A1}$ | $A_{A1}$ | $C_{A1}$ | $T_1$ | 1-0 |
| | | | B | $(X_{B1},Y_{B1},Z_{B1})$ | $V_{B1}$ | $S_{B1}$ | $P_{B1}$ | $A_{B1}$ | $C_{B1}$ | | |
| 2 | $(X_2,Y_2,Z_2)$ | $S_2$ | A | $(X_{A2},Y_{A2},Z_{A2})$ | $V_{A2}$ | $S_{A2}$ | $P_{A2}$ | $A_{A2}$ | $C_{A2}$ | $T_2$ | 1-0 |
| | | | B | $(X_{B2},Y_{B2},Z_{B2})$ | $V_{B2}$ | $S_{B2}$ | $P_{B2}$ | $A_{B2}$ | $C_{B2}$ | | |
| | ... | | | ... | | | | | | ... | ... |

FIG.5
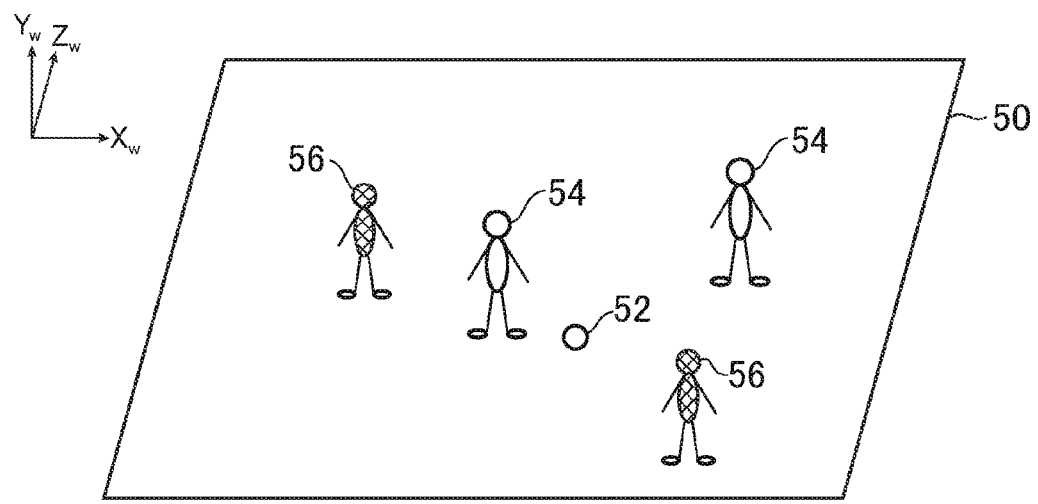
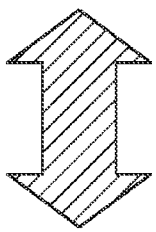
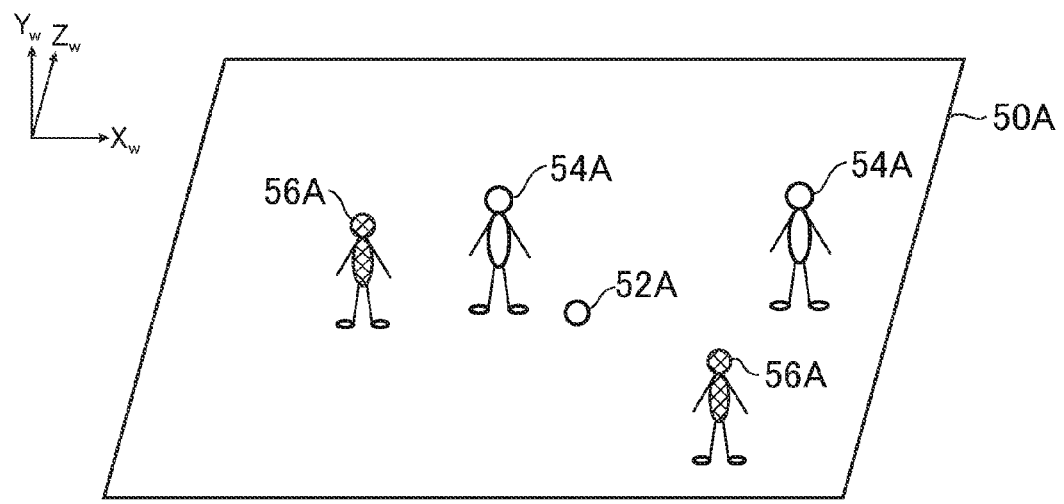

SIMULATION DEVICE, SIMULATION METHOD, PROGRAM, AND INFORMATION STORAGE MEDIUM

CROSS REFERENCE TO RELATED APPLICATIONS

This application is a National Stage of International Application No. PCT/JP2014/066559 filed on Jun. 23, 2014, which claims priority to Japanese Patent Application No. 2013-189558 filed on Sep. 12, 2013. The contents of each of the above documents are incorporated herein by reference in their entirety.

TECHNICAL FIELD

The present invention relates to a simulation device, a simulation method, a program, and an information storage medium.

BACKGROUND ART

Simulation devices have been known for simulating a motion of a player in a sports game. For example, Patent Literature 1 describes a simulation device for simulating a motion of a character other than an operation target of a user in a soccer game played between characters belonging to the user's team and characters belonging to an opponent's team.

CITATION LIST

Patent Document

Patent Literature 1: JP2010-022493A

SUMMARY OF INVENTION

Technical Problem

The above described device is desired to improve accuracy of a simulation so that motions of characters other than the user's operation target approximate motions of players in the real world. However, it is difficult to reproduce motions of players in an actual game by merely using a behavioral algorithm assuming motions of the players, for example, and sometimes the players in simulation make movements impossible in the real world.

One or more embodiments of the present invention have been conceived in view of the above, and an object thereof is to provide a simulation device, a simulation method, a program, and an information storage medium capable of improving accuracy of a simulation regarding a motion of a player in a sports game.

Solution to Problem

In order to solve the above described problems, a simulation device according to the present invention for simulating a motion of a player in a sports game includes first control means for simulating a motion of a virtual player that is one of a plurality of virtual players placed in a virtual world and other than an operation target of a user, obtaining means for obtaining content stored in storing means that stores data associating a situation of the sports game performed in a real world with a motion of an actual player in the game, determining means for determining whether a situation of a game being simulated in the virtual world and the situation indicated in the data are similar to each other, and second control means for controlling the virtual player other than the operation target of the user, in a case where it is determined that the situation of the game in the virtual world and the situation indicated in the data are similar to each other, in place of the first control means based on the motion associated with the situation.

A simulation method according to the present invention for simulating a motion of a player in a sports game includes a first control step for simulating a motion of a virtual player that is one of a plurality of virtual players placed in a virtual world and other than an operation target of a user, a step for obtaining content stored in storing means that stores data associating a situation of the sports game performed in a real world with a motion of an actual player in the game, a determining step for determining whether a situation of a game being simulated in the virtual world and the situation indicated in the data are similar to each other, and a second control step for controlling the virtual player other than the operation target of the user, in a case where it is determined that the situation of the game in the virtual world and the situation indicated in the data are similar to each other, in place of the first control step based on the motion associated with the situation.

A program according to the present invention for causing a computer that simulates a motion of a player in a sports game to function as first control means for simulating a motion of a virtual player that is one of a plurality of virtual players placed in a virtual world and other than an operation target of a user, obtaining means for obtaining content stored in storing means that stores data associating a situation of the sports game performed in a real world with a motion of an actual player in the game, determining means for determining whether a situation of a game being simulated in the virtual world and the situation indicated in the data are similar to each other, and second control means for controlling the virtual player other than the operation target of the user, in a case where it is determined that the situation of the game in the virtual world and the situation indicated in the data are similar to each other, in place of the first control means based on the motion associated with the situation.

BRIEF DESCRIPTION OF DRAWINGS

FIG. 4 is a diagram illustrating an example of data stored in a scenario database;

FIG. 5 is a diagram illustrating a case where a situation indicated in game situation data and a situation in a scenario are similar to each other;

DESCRIPTION OF EMBODIMENTS

[1. Hardware Configuration of Simulation Device]

In the following, an example of an embodiment of the present invention will be discussed in detail with reference to the accompanying drawings. In this embodiment, a case is discussed in which a simulation device (computer) according to the present invention is implemented in a game device. The game device is implemented by, for example, a home-use/commercial game machine (stationary game machine), a portable game machine, a mobile phone (including smartphone), a mobile information terminal (tablet), or a personal computer. Here, a case is discussed in which the game device according to the embodiment is implemented by a home-use game machine.

Figure 1:
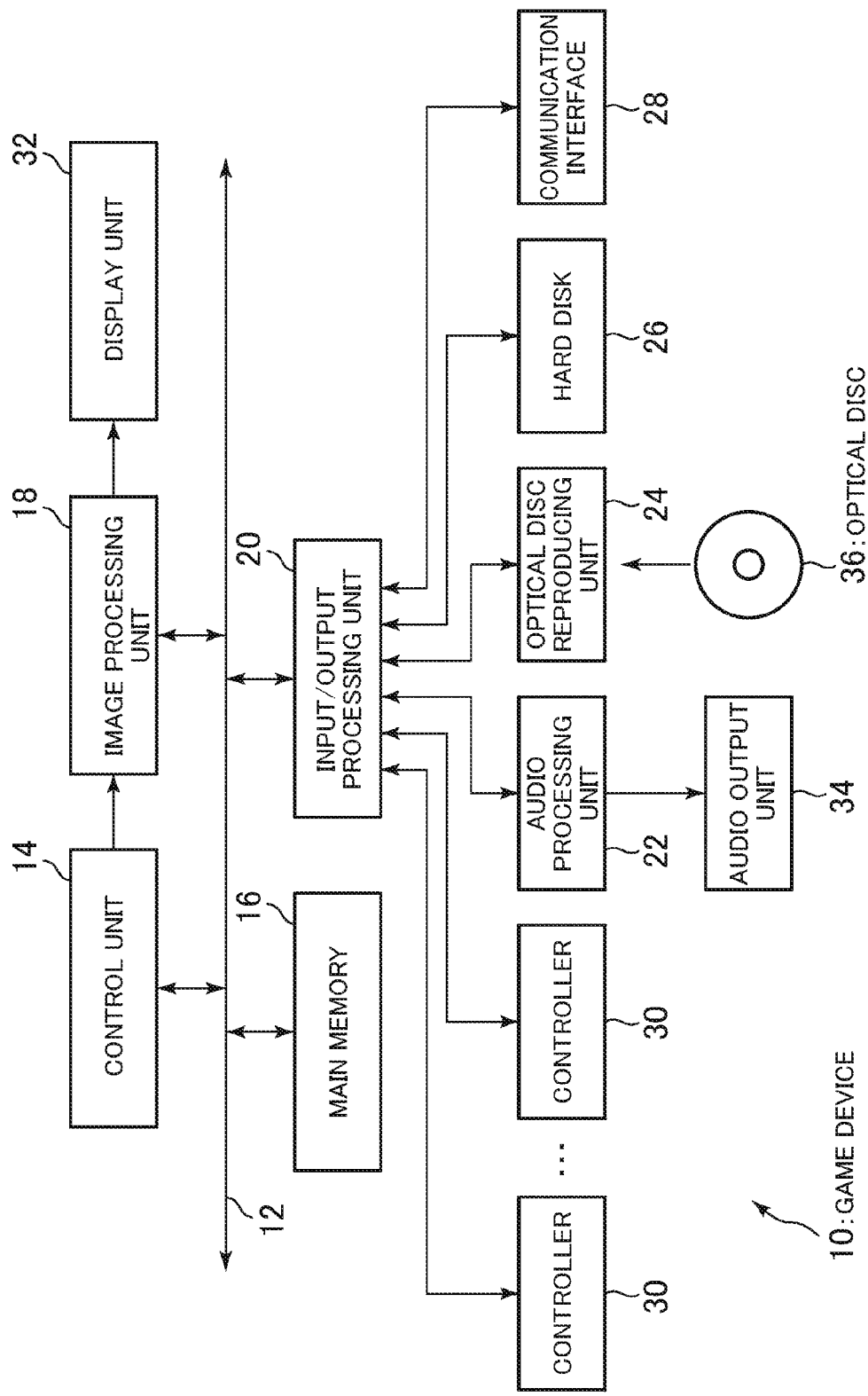
FIG. 1 is a diagram illustrating a hardware configuration of an embodiment of a game device according to the present invention.

FIG. 1 illustrates a hardware configuration of the game device according to the embodiment of the present invention. The game device 10 shown in FIG. 1 is connected to a display unit 32 and an audio output unit 34. The display unit 32 is, for example, a consumer television set or a liquid crystal display. The audio output unit 34 is, for example, speakers or headphones incorporated in the consumer television set.

The game device 10 is a known computer game system. The game device 10 includes a bus 12, a control unit 14, a main memory 16, an image processing unit 18, an input/output processing unit 20, an audio processing unit 22, an optical disc reproducing unit 24, a hard disk 26, a communication interface 28, and a controller 30.

The control unit 14 includes one or more control units (e.g., CPU). The control unit 14 executes processing for controlling each unit of the game device 10 or information processing based on an operating system stored in a ROM (not shown) or a program read from an optical disc 36.

The main memory 16 includes, for example, a RAM. A program and data read from the optical disc 36 is written into the main memory 16. The main memory 16 is also used as a working memory of the control unit 14. The bus 12 is used for exchanging addresses and data between the units of the game device 10.

The image processing unit 18 includes a VRAM. The image processing unit 18 draws a game screen in the VRAM based on image data provided by the control unit 14. The game screen drawn in the VRAM is converted into a video signal and fed into the display unit 32 at a predetermined timing.

The input/output processing unit 20 is an interface for enabling the control unit 14 to access the audio processing unit 22, the optical disc reproducing unit 24, the hard disk 26, the communication interface 28, and the controller 30.

The audio processing unit 22 includes a sound buffer. The audio processing unit 22 outputs, from the audio output unit 34, audio data read from the optical disc 36 into the sound buffer.

The communication interface 28 is an interface for connecting the game device 10 to a communication network, such as the Internet, via a wired or wireless connection.

The optical disc reproducing unit 24 reads programs and data stored in the optical disc 36 (information storage medium). In this embodiment, a case will be discussed in which the optical disc 36 is used for providing the game device 10 with programs and data, although the programs and data may be provided to the game device 10 with use of other information storage medium such as a memory card. Alternatively, for example, programs or data may be provided to the game device 10 from remote places via a communication network.

The hard disk 26 is a conventional hard disk device (auxiliary storage device). In this embodiment, programs or data to be stored in the optical disc 36 may be also stored in the hard disk 26.

The controller 30 is a general operation means for receiving user's various game operations. One or more controllers 30 are connected to the game device 10 in wired or wireless manner. The input/output processing unit 20 scans a state of each of operating members of the controller 30 at predetermined intervals (e.g., every 1/60 second). An operation signal indicative of the scanning result is fed into the control unit 14 via the bus 12. The control unit 14 specifies a game operation of the user based on the operation signal. In this embodiment, operations performed by the user with the controller 30 may be replaced by other operations. For example, a sound-detecting device (e.g., microphone) for detecting sound may be connected to the game device 10 so that various operations are performed by analyzing sound. Further, in addition to being connected from an outside in wired or wireless manner, the controller 30 may integrally form a housing with the game device 10.

[2. Simulation Executed by Game Device]

The game device 10 executes a game to simulate motions of players in a sports game played between multiple teams by running a game program read out from the optical disc 36. Here, the sports game includes various competitions performed in the real world. For example, the game device 10 executes a game relating to sports in which a player aims to move a moving object (e.g., ball and puck) to a moving target position (e.g., goal).

Specifically, in this embodiment, a soccer game is executed between a team operated by a user (hereinafter "user's team") and a team operated by an opponent (computer or another user) (hereinafter "opponent's team"). For example, in this soccer game, teams and game characters respectively corresponding to soccer teams and soccer players in the real world are used. Each game character belongs to one of the teams respectively imitating soccer teams in the real world. When the game device 10 starts a soccer game, a game space is constructed in the main memory 16.

Figure 2:
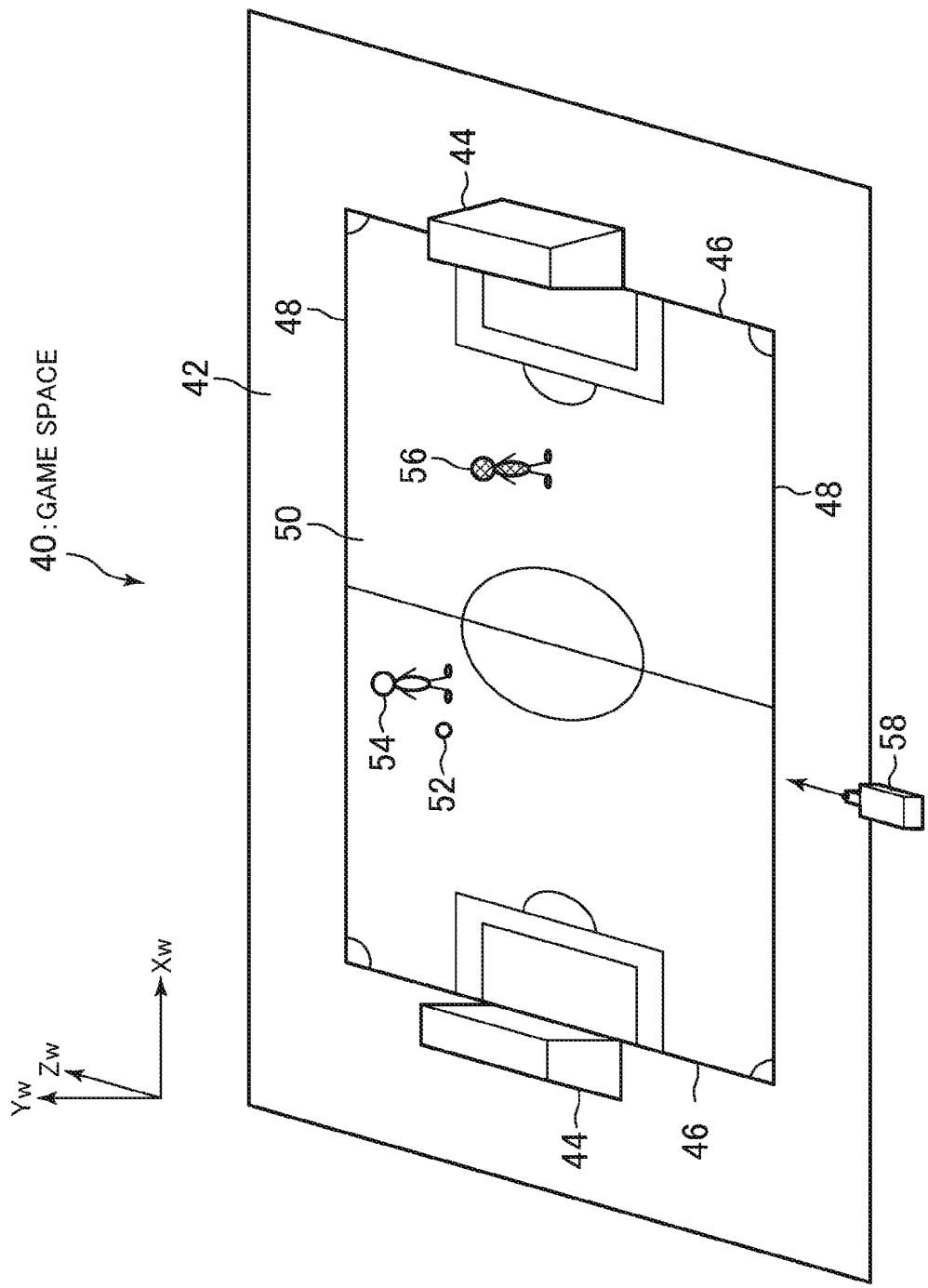
FIG. 2 is a diagram illustrating an example of a game space.

FIG. 2 illustrates an example of the game space. The game space 40 illustrated in FIG. 2 is a virtual three-dimensional space in which three coordinate axes (Xw-axis, Yw-axis, and Zw-axis) are orthogonal to one another. As shown in FIG. 2, a field 42, which is an object representing a soccer field (a plane on which other objects are placed), is placed in the game space 40.

The field 42 has goals 44, which are objects representing soccer goals, two goal lines 46, and two touchlines 48. The game is played on a pitch 50, which is enclosed by the goal lines 46 and the touchlines 48, and areas around the pitch 50 (given areas other than the pitch 50 and in contact with the goal lines 46 or the touchlines 48).

On the field 42, there are arranged objects including a ball 52 representing a soccer ball (moving object), a character 54 representing a soccer player belonging to the user's team, a character 56 representing a soccer player belonging to the opponent's team. A position of each object is specified by, for example, three-dimensional coordinates of a world coordinate system (Xw-Yw-Zw coordinate system). Although omitted from FIG. 2, there are arranged eleven characters 54 of the user's team and eleven characters 56 of the opponent's team on the field 52.

When the character 54 (56) and the ball 52 move towards each other, the character 54 (56) and the ball 52 are associated with each other under the predetermined states. In this case, a moving action of the character 54 (56) is dribbling. In the following, the state in which the player character 54 (56) is associated with the ball 52 is described as "the player character 54 (56) is in possession of the ball 52." The character 54 (56) in possession of the ball 52 moves the ball 52 by performing a predetermined motion (e.g., passing motion or shooting motion). When the character 54 (56) moves the ball 52 to within the goal 44, a scoring event is generated.

A virtual camera 58 (point of view) is set up in the game space 40. The display unit 32 displays a game screen showing the game space 40 viewed from the virtual camera 58. The game screen is generated by coordinate-transforming vertex coordinates of respective objects placed on the game space 40 from the world coordinate system into the screen coordinate system using the predetermined coordinate transformation calculation.

In this embodiment, among the characters 54 (56) placed on the game space 40, one of the characters 54 that belongs to the user's team is set to an operation target (player character) of the user. The operation target of the user operates based on the user's operation. For example, the user's operation target moves in a direction instructed by the user, or performs motions (e.g., shooting motion and passing motion) instructed by the user.

The characters 54 (56) other than the user's operation target are under the control of a computer. In the following, the characters 54 (56) other than the user's operation target are also referred to as non-player characters. In this embodiment, two types of control modes are prepared for operating the non-player characters.

In a first mode, the non-player characters operate based on a behavioral algorithm (behavioral rule) determined by a game creator in advance. In the following, the first mode is referred to as a simulation mode. Various types of known behavioral algorithms may be applied in the simulation mode. For example, in the simulation mode, motions of the non-player characters are determined based on an algorithm (or data defining motions) programmed in advance by the game creator, for example, or one or more random elements.

In a second mode, the non-player characters operate based on data defining motions actually performed by players in sports games in the real world. In the following, the second mode is referred to as an imitation mode. The data defines motions of players when a scoring event is generated in a soccer game in the real world, or when a team does not allow goals in a situation where the team likely gives up a goal. In the imitation mode, the non-player characters do not necessarily reproduce the motion exactly defined in the data. That is, the non-player characters may operate based on the motion defined in the data, and a difference within a certain range is allowed between the motion actually performed by the player in the real world and the motion performed by the non-player characters. When the mode shifts to the imitation mode, the user aims to reproduce an event of the sports game in the real world, or acquire a better result than such event.

In this embodiment, the non-player characters basically operate in the simulation mode. In a case where a situation of the game being executed is similar to that of the game in the real world, all or some of the non-player characters are switched to being controlled in the imitation mode. In this regard, in a case where only some of the non-player characters operate in the imitation mode, the other non-player characters operate in the simulation mode. In other words, the non-player characters operating in the simulation mode and the non-player characters operating in the imitation mode coexist in the game space 40.

The non-player characters operating in the imitation mode return to being controlled in the simulation mode under the predetermined states. In the cases where the non-player characters finish a series of motions performed by the actual players, the situation of the game being executed is no longer similar to the situation of the game in the real world, and the user's operation target performs a predetermined motion, for example, the non-player characters operating in the imitation mode return to being controlled in the simulation mode. Afterward, if the situation of the game is again similar to the situation of the game in the real world, all or some of the non-player characters operate in the imitation mode. Subsequently, until the game is finished, the control of the non-player characters is switched between the simulation mode and the imitation mode.

As described above, the game device 10 of this embodiment switches the simulation mode and the imitation mode to control the non-player characters according to the situation of the game being executed, thereby improving motion control of the non-player characters. In the following, such technology will be discussed.

[3. Functions Implemented in Game Device]

Figure 3:
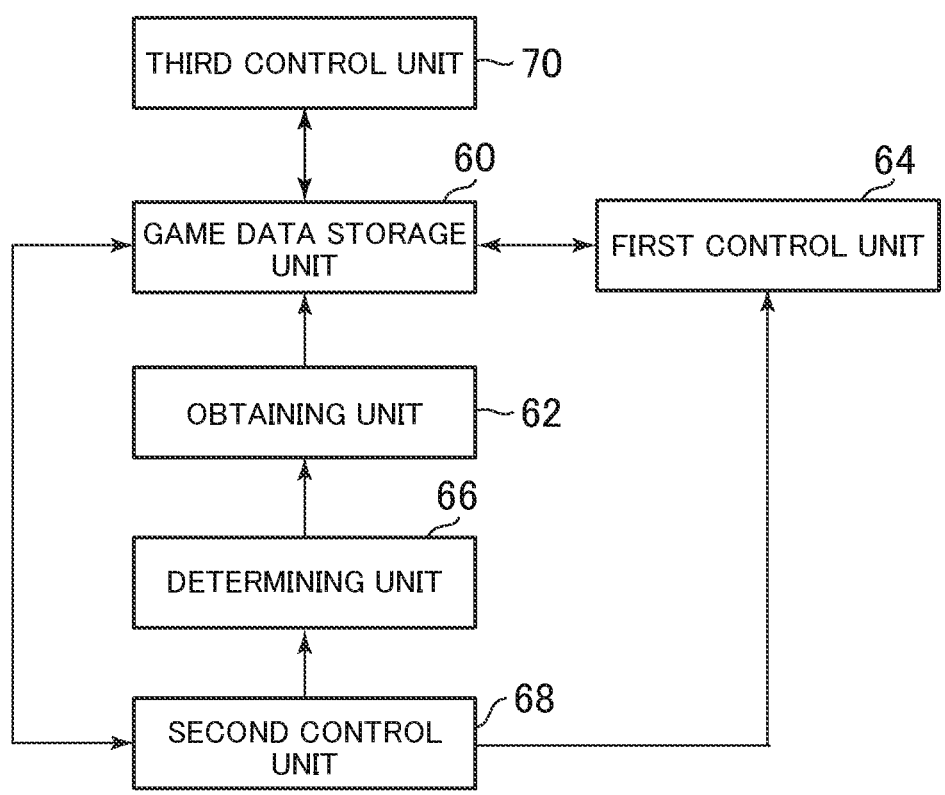
FIG. 3 is a functional block diagram of functions that are implemented in the game device and related to the present invention.

FIG. 3 is a functional block diagram indicating functions implemented in the game device 10 and related to the present invention. As shown in FIG. 3, the game device 10 executes a game program to implement a game data storage unit 60, an obtaining unit 62, a first control unit 64, a determining unit 66, a second control unit 68, and a third control unit 70.

The game data storage unit 60 is mainly implemented by the main memory 16, the hard disk 26, and the optical disc 36, and other functions are mainly implemented by the control unit 14. The functions essential to the game device 10 are the obtaining unit 62, the first control unit 64, the determining unit 66, and the second control unit 68, and other functions may be omitted.

[3-1. Game Data Storage Unit]

The game data storage unit 60 stores various data necessary for simulating sports games. Here, a scenario database and game situation data will be discussed as an example of data stored in the game data storage unit 60.

[Scenario Database]

FIG. 4 is a diagram illustrating an example of data stored in the scenario database. As shown in FIG. 4, the scenario database is a collection of data defining motions actually performed by players in the real world. Here, the scenario database includes a plurality of items of data associating situations of sports games performed in the real world and motions of actual players (e.g., soccer players in the real world) in the game. In the following, each data unit (record) stored in the scenario database is also referred to as a scenario.

Each scenario has combinations of situations and motions. For example, each scenario stores combination of situations of games in the real world and motions of respective players on a time series. More specifically, each scenario stores states of players and a ball on a field on a time series, and includes items specified below, for example. The lengths of respective motions defined in scenarios (i.e., the number of seconds of respective motions defined in scenarios) may be the same or different between the scenarios. That is, one scenario may indicate a five-second long motion in the real world, and another scenario may indicate a ten-second long motion in the real world.

(1) State of a ball in a game of the real world (e.g., position, direction, and moving velocity)
(2) State of a player in the game of the real world (e.g., position, direction, moving velocity, posture (pose), action, and other States (e.g., player is lying or jumping))
(3) Game time (elapsed time since the start or restart of the game) in the real world and scores of respective teams at that time The positions and the directions stored in scenarios are defined by coordinates or vectors of a world coordinate system. For example, each scenario is defined such that a position and a direction in a pitch in the real world correspond to a position and a direction in the pitch 50 in the game space 40. That is, positions and directions of the ball 52 and the characters 54 (56) in the pitch 50, which are indicated in respective scenarios, approximately correspond to positions and directions of a ball and players in the pitch in the real world. With the scenario defined in this way, it is possible to operate the non-player characters based on the positions and the directions to which the players in the real world move in a relatively simple processing.

Similarly, a moving velocity stored in each scenario is defined such that a velocity in the game space 40 corresponds to a moving velocity of a ball and a player in the real world. In addition, some types of postures that the characters 54 (56) can take in a game are prepared. Each scenario stores, as information indicating postures of players, information indicating which of these types of postures an actual posture of a player in the real world belongs to. With the scenario defined in this way, it is possible to operate the non-player characters based on the moving velocities and postures of the players in the real world in a relatively simple processing.

Similarly, some types of actions that the characters 54 (56) can perform in a game are prepared. Each scenario stores, as information indicating actions of players, information indicating which of these types of actions an actual action of a player in the real world belongs to. Further, some types of states that the characters 54 (56) can take in a game are prepared. Each scenario stores, as information indicating states of players, information indicating which of these types of states an actual state of a player in the real world belongs to. With the scenario defined in this way, it is possible to operate the non-player characters based on the actions of the players in the real world in a relatively simple processing.

In this embodiment, a scenario defines the number of non-player characters controlled in the scenario. Further, a scenario stores information for identifying a target team to control in the imitation mode based on the scenario, and information for identifying a character 54 (56) to control among the players belonging to the team. With the scenario defined in this way, it is possible to control non-player characters corresponding to players in the real world based on the motions actually performed by the players.

That is, a scenario stores, on a time series, motions that are actually performed by real-world players respectively corresponding to the characters 54 (56) to be controlled in the imitation mode based on the scenario. In other words, a scenario stores information for identifying the non-player characters that should be operated in the imitation mode based on the scenario, and stores motions (i.e., motions performed by real-world players) to be performed by each of the non-player characters in the pitch 50 on a time series.

The content of scenarios stored in the scenario database may be determined by an operation of a set-up person (e.g., game creator, data provider, user), or automatically generated based on the content set by the set-up person. For example, the set-up person may manually input only information indicating positions and directions of players and the ball in the real world on a time series, so that respective scenarios are generated using an algorithm for analyzing postures and actions of respective players based on time-series changes in the information.

The items stored in scenarios of the scenario database are not limited to the above example. Each scenario may store combinations of situations of sports games in the real world and motions of respective players. For example, a scenario may store information for identifying a player in possession of a ball, and information for identifying a formation set in each team and positions of respective players. In addition, a scenario may store various kinds of information (e.g., ball control rate and running distance of player) indicating situations of a game.

[Game Situation Data]

The game situation data indicates situations of a game being executed (i.e., situations of a game being simulated). For example, parameters as indicated below are stored in the game situation data. The game situation data is appropriately updated according to the progress of the game.
(1) Information for identifying the user's operation target
(2) Information for identifying whether respective non-player characters are operated in the simulation mode or in the imitation mode
(3) Information for identifying a character 54 (56) in possession of a ball 52
(4) Current state of the ball 52 (e.g., position, moving direction, and moving velocity of the ball 52)
(5) Current state of the characters 54 (56) (e.g., position, moving direction, moving velocity, posture, action, and other states of the characters 54 (56))
(6) State of the game being executed (e.g., scores of both teams and elapsed time of the game)

The data stored in the game situation data is not limited to the above example. The game situation data may store data indicating the current situation of the game space 40, for example, a current position and viewing direction of the virtual camera 58, a strategy and a formation for each team, and current positions set for respective characters 54 (56).

The data stored in the game data storage unit 60 is not limited to the above example. The game data storage unit 60 may store data necessary for executing a game. For example, the game data storage unit 60 may store data relating to respective characters 54 (56) (e.g., information for uniquely identifying players, ability parameters of players) and data indicating formations settable for respective teams.

[3-2. Obtaining Unit]

The obtaining unit 62 obtains content stored in storing means (e.g., game data storage unit 60) for storing data (e.g., scenario) in which situations of sports games in the real world are associated with motions of actual players in the game. The obtaining unit 62 obtains scenarios stored in the scenario database in the game data storage unit 60.

[3-3. First Control Unit]

The first control unit 64 simulates motions of virtual players that are placed in the virtual world (e.g., non-player characters belonging to any of the teams) and other than the user's operation target. Here, the first control unit 64 simulates motions of respective non-player characters based on current states of the non-player characters stored in the game situation data and a given behavioral algorithm.

For example, the first control unit 64 determines motions to be performed by the respective non-player characters by substituting parameters indicating current states of the respective non-player characters and the ball 52 for a numerical formula defined in the behavioral algorithm. More specifically, for example, the first control unit 64 substitutes the parameters indicating the states of the ball 52 (e.g., position, moving direction, moving velocity) and the parameters indicating the states of the respective non-player characters (e.g., position, moving direction, moving velocity, position) for the numerical formula of the behavioral algorithm, thereby calculating the motions to be respectively performed by the non-player characters (e.g., positions or directions to which the non-player characters should move).

In other words, the first control unit 64 simulates motions of the respective non-player characters based not on the scenario stored in the scenario database. The first control unit 64 may change motions of the respective non-player characters based on one or more random elements. That is, for example, the first control unit 64 may cause the non-player characters to perform motions defined based on a given behavioral algorithm and one or more random numbers.

In this embodiment, in a case where it is determined that a situation of a game in the virtual world (e.g., situation indicated by the game situation data) is similar to a situation indicated in a scenario, the first control unit 64 operates the virtual players (e.g., non-player characters) that are other than the user's operation target and other than virtual players to be controlled by the second control unit 68 (i.e., the non-player characters to be operated according to the imitation mode). That is, the first control unit 64 operates the characters 54 (56) that are other than the user's operation target and are not controlled by the second control unit 68, as described above.

The method of the first control unit 64 for moving the non-player characters is not limited to the example described above. Various known simulation methods can be applied to the motion control of the first control unit 64. For example, the first control unit 64 may determine a motion of a non-player character based on a position or ability of the non-player character, or according to a game status.

[3-4. Determining Unit]

The determining unit 66 determines whether a situation of a game being simulated in the virtual world (i.e., situation of a game being executed) is similar to a situation indicated by a scenario (e.g., situations respectively indicated by scenarios). The determining unit 66 determines whether a difference between a situation indicated by the game situation data and a situation indicated by each scenario is equal to or more than a reference value.

FIG. 5 is diagram illustrating a case where the situation indicated by the game situation data is similar to the situation indicated by the scenario. As shown in FIG. 5, for example, the determining unit 66 determines that the situations are similar to each other when a difference between a positional relation of the ball 52 on the pitch 50 and the characters 54 (56) and a positional relation of the ball and the players stored in the scenario (in FIG. 5, pitch 50A, ball 52A, and characters 54A (56A)) is relatively small.

Here, the determining unit 66 calculates, for each non-player character to be controlled in each scenario, similarity (player's situation similarity) of a situation corresponding to such non-player character. In this regard, although the situations are not so similar in view of the entire pitch, sometimes the situations are similar to each other when the situations are compared by taking a certain non-player character (e.g., non-player character in possession of a ball) as a reference. Specifically, in the game of this embodiment, for example, the motion of the non-player character close to the ball 52 strongly affects changes in the situation of the game, and the motion of the non-player character being away from the ball 52 hardly affects changes in the situation of the game. As such, the determining unit 66 can appropriately calculate a similarity of situations of the games by calculating a player's situation similarity corresponding to a certain non-player character.

Specifically, a scenario includes m types of parameters (m is a natural number, which is herein equal to or greater than 2) relating to non-player characters to be controlled in the scenario. The determining unit 66 calculates a player's situation similarity based on m types of parameters relating to non-player characters to be controlled in each scenario and the m types of parameters indicated in the game situation data. Such player's situation similarity indicates differences among the m types of parameters.

For example, the determining unit 66 substitutes the m types of parameters for a predetermined numerical formula, thereby calculating the player's situation similarity. The numerical formula may be different among non-player characters, or may be common. Here, the determining unit 66 assumes m types of parameters stored in a scenario as a m-dimensional vector, and also assumes m types of parameters indicated by the game situation data as a m-dimensional vector. The determining unit 66 calculates the player's situation similarity based on the directional relation between these two vectors. The determining unit 66 calculates, as the player's situation similarity, a numerical value of an angle defined by the two vectors.

The determining unit 66 calculates an overall similarity (hereinafter, simply referred to as similarity) based on player's situation similarities of respective non-player characters to be controlled in the scenario. For example, the determining unit 66 calculates the weighting total of player's situation similarities of respective non-player characters, thereby calculating the similarity. The determining unit 66 determines that the situations are not similar when the similarity is less than the reference value, and that the situations are similar when the similarity is equal to or more than the reference value. The reference value may be different among the scenarios, or may be common. For example, when the positional relation of the players in the real world and the positional relation of the characters 54 (56) are not substantially the same, the reference value may be set relatively high if the scenario is difficult to be reproduced in the game space 40.

The determining method of the determining unit 66 is not limited to the above example. For example, when the determining unit 66 calculates a similarity, parameters may be weighed differently. For example, in the game of this embodiment, states of the character 54 (56) close to the ball 52 strongly affect changes in the situation of the game as described above. As such, the determining unit 66 may set greater coefficients to be multiplied with the parameter indicating the states of the ball 52 and the character 54 (56) in possession of the ball 52 than coefficients of other parameters, thereby calculating the player's situation similarity with more emphasis on the states of the ball 52 and the character 54 (56) in possession of the ball 52. Further, calculation of the player's situation similarity may use information on whether each non-player character is set with a character to guard, information on a pass that the non-player character in possession of the ball 52 is available, information on empty spaces on the pitch 50, and information on a game time, score, position, ability (skill), team, and formation. In addition, when the determining unit 66 calculates the weighting total of player's situation similarities, the non-player characters may be weighed differently. For example, the determining unit 66 may set relatively large coefficient of the player's situation similarity of the non-player character relatively close to the ball 52.

[3-5. Second Control Unit]

When it is determined that the situation of the game in the virtual world (e.g., situation of the game being executed) and the situation indicated in the scenario (e.g., situation indicated in at least one of the scenarios) are similar to each other, the second control unit 68 controls, in place of the first control unit 64, the virtual players other than the user's operation target (e.g., some of the non-player characters respectively belonging to the teams) based on motions associated with the situation (e.g., motions indicated in the scenario that is determined to be similar among the scenarios).

For example, the second control unit 68 operates the non-player characters based on the scenario that is stored in the scenario database and has the similarity equal to or more than the reference value calculated by the determining unit 66. That is, the second control unit 68 switches the motion control of one or more non-player characters in the simulation mode to the motion control in the imitation mode based on the scenario having the similarity equal to or more than the reference value.

In this embodiment, when it is determined that the situation of the game in the virtual world (e.g., situation of the game being executed) and the situation indicated in the scenario are similar to each other, the second control unit 68 selects the virtual players as the control target (e.g., character group including a plurality of non-player characters) based on the scenario among from the virtual players other than the user' operation target. The control target of the second control unit 68 may be a single non-player character or multiple non-player characters. Further, all of the non-player characters may be the control target of the second control unit 68, or only some of the non-player characters may be the control target of the second control unit 68. Alternatively, in a case where the player's situation similarity is calculated as in this embodiment, only the non-player character having the player's situation similarity equal to or more than the reference value may be the control target of the second control unit 68.

Here, a scenario is defined with characters 54 (56) to be operated based on the scenario, and thus the second control unit 68 selects, as the control target, characters 54 (56) indicated in the scenario among from non-player characters of respective teams. The second control unit 68 controls, in place of the first control unit 64, the selected characters 54 (56).

Figure 6:
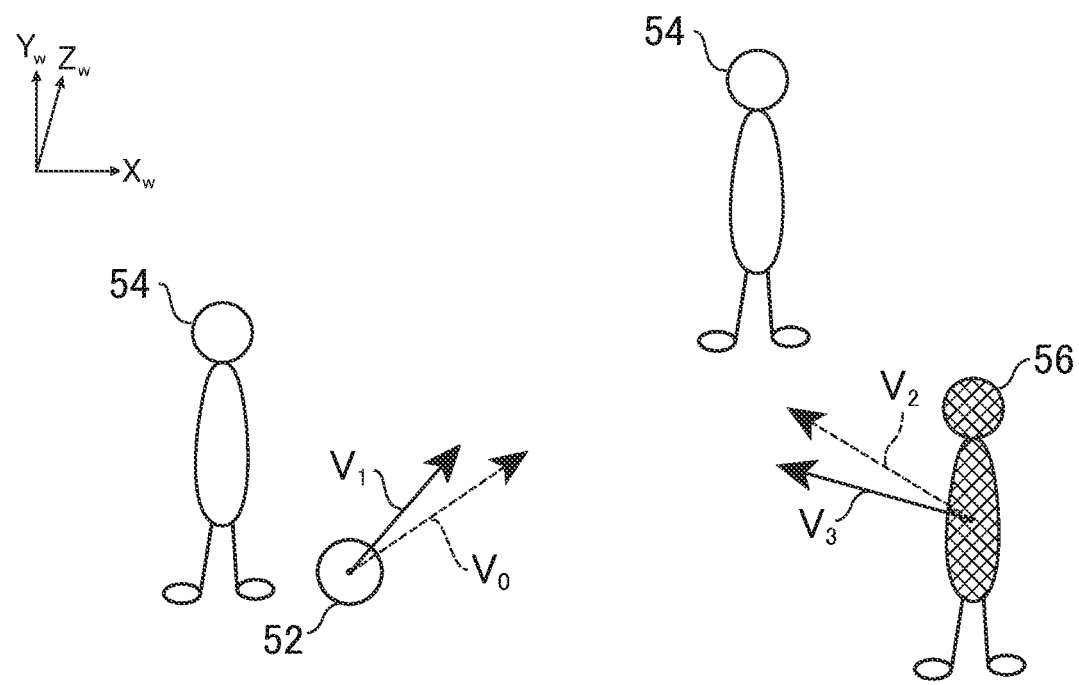
FIG. 6 is a diagram explaining motion control in an imitation mode.

FIG. 6 is a diagram for explaining the motion control in the imitation mode. In FIG. 6, assume that a scenario defines a motion in which a character 54 in possession of the ball 52 passes the ball to another character 54 and a motion in which a character 56 of the opponent's team tries to take the ball 52. In this case, the second control unit 68 makes the character 54 in possession of the ball 52 to pass the ball such that a difference between the direction $V_0$ of the pass defined in the scenario and the direction $V_1$ to which the character 54 passes the ball 52 is within the reference value. Further, the second control unit 68 moves the character 56 such that a difference between the moving direction $V_2$ of the player defined in the scenario and the moving direction $V_3$ of the character 56 is within the reference value. In this way, the second control unit 68 operates the non-player characters such that a difference between a motion of a player defined in a scenario and a motion of a non-player character corresponding to the player is less than the reference value.

Specifically, for example, the second control unit 68 operates the non-player characters in the imitation mode as follows.

For example, the second control unit 68 moves the non-player characters such that a difference between a position, a moving direction, or a moving velocity of a player indicated in a scenario and a position, a moving direction, or a moving velocity of a non-player character corresponding to the player is less than the reference value. Here, when a distance between the position of the player indicated in the scenario and the position of the non-player character is less than the reference distance, the difference between the positions is less than the reference value. Further, when an angle between the moving direction of the player indicated in the scenario and the moving direction of the non-player character is less than the reference angle, the difference between the positions is less than the reference value. In addition, when a difference between the moving velocity of the player indicated in the scenario and the moving velocity of the non-player character is less than the reference velocity, the difference between the moving velocities is less than the reference value.

Further, for example, in a case where a motion of a player in possession of the ball is defined in a scenario, the second control unit 68 makes a non-player character to move the ball 52 such that a difference between a position, a moving direction, or a moving velocity to which the player moves the ball and a position, a moving direction, or a moving velocity to which the non-player character in possession of the ball 52 moves the ball 52 is less than the reference value. Here, when a distance between the position of the ball indicated in the scenario and the position of the ball 52 moved by the non-player character is less than the reference distance, the difference between the positions is less than the reference value. Further, when an angle between the moving direction of the ball indicated in the scenario and the moving direction of the ball 52 moved by the non-player character is less than the reference angle, the difference between the moving directions is less than the reference value. In addition, when a difference between the moving velocity of the ball indicated in the scenario and the moving velocity of the ball 52 moved by the non-player character is less than the reference velocity, the difference between the moving velocities is less than the reference value.

Further, for example, in a case where a motion of a player in possession of the ball and a motion of another player are defined in a scenario, the second control unit 68 moves the non-player character such that a difference between a positional relation of the ball indicated in the scenario or the player in possession of the ball and another player and a positional relation of the ball 52 or the character 54 (56) in possession of the ball 52 and another character 54 (56) is less than the reference value. Here, when a difference between the position of another player when taking the ball or the player in possession of the ball indicated in the scenario as a reference position and the position of another character 54 (56) when taking the ball 52 or the character 54 (56) in possession of the ball 52 as a reference position is less than the reference value, a difference between the positional relations is less than the reference value.

Further, for example, the second control unit 68 operates the non-player characters such that a difference between the time at which a player performs a motion indicated in a scenario (e.g., time to pass or shoot and time to start moving) and the time at which a non-player character corresponding the player performs the motion is less than a reference value. Here, when a time difference between an operation timing defined in the scenario and an operation timing at which the non-player character performs the motion is less than the reference value, a difference between the timings is less than the reference value.

The method of the second control unit 68 for controlling the non-player characters is not limited to the above example. The second control unit 68 may operate the non-player characters based on motions defined in scenarios. Alternatively, for example, motions respectively similar to a plurality of types of motions may be determined in advance, and the second control unit 68 may make the non-player characters to perform motions similar to the motions indicated in the scenario.

[3-6. Third Control Unit]

The third control unit 70 operates the user's operation target (e.g., character 56) based on the operation of the user. Here, assume that association of types of operations that the user can perform using the controller 30 with respective types of motions that the operation target should perform (i.e., correspondence relation between operation and motion) is stored in the game data storage unit 60. The third control unit 70 makes the user's operation target to perform the motion associated with the operation performed by the user. For example, when the user performs an operation to indicate a direction, the third control unit 70 moves the user's operation target in the direction indicated by the operation, and when the user performs an operation to pass or shoot the ball, the third control unit 70 makes the user's operation target to pass or shoot the ball.

[4. Processing Executed in Game Device]

Figure 7:
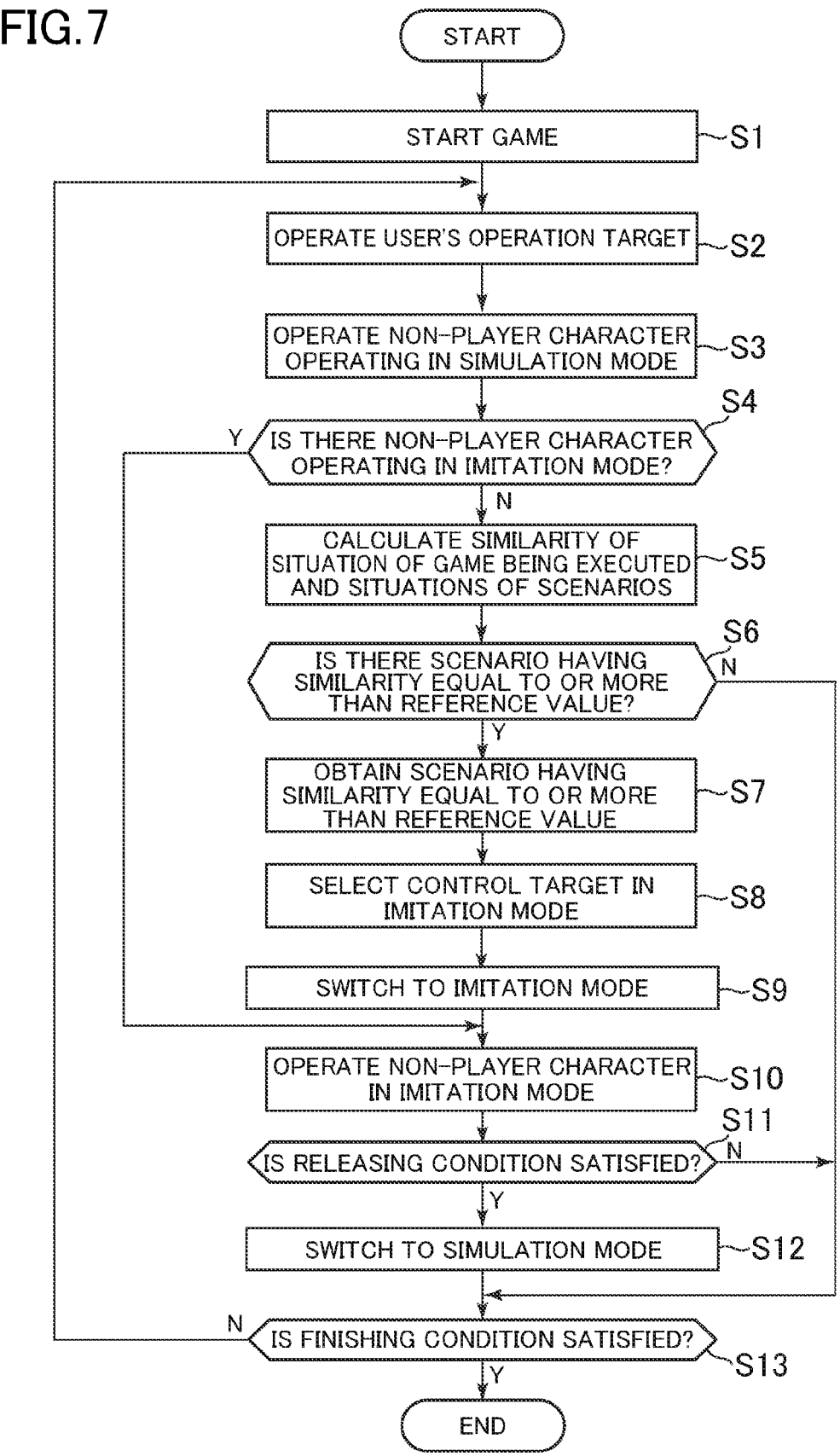
FIG. 7 is a flow chart of processing executed by the game device.

FIG. 7 is a flow chart indicating processing executed by the game device 10. The processing shown in FIG. 7 is executed after a game starts. The control unit 14 executes the processing described below according to a program stored in the optical disc 36, and the functional blocks shown in FIG. 3 are implemented. For simplicity, a processing flow is discussed in which the number of scenarios executed at the same time is one and a plurality of non-player characters are controlled in one scenario.

As shown in FIG. 7, the control unit 14 constructs the game space 40, and starts a game (S1). In S1, the control unit 14 generates and stores game situation data in the main memory 16. For example, the control unit 14 arranges the ball 52 and the characters 54 (56) at the initial positions on the pitch 50. In this embodiment, at the start of the game, the non-player characters are set to operate in the simulation mode, although some of the non-player characters may operate in the imitation mode at the start of the game.

The control unit 14 operates the user's operation target based on the user's operation (S2). In S2, the control unit 14 makes the user's operation target to perform a motion associated with the user's operation.

The control unit 14 operates the non-player characters to perform motions in the simulation mode (S3). In S3, the control unit 14 determines motions of the non-player characters in the simulation mode based on the current states of the non-player characters and a given behavioral algorithm. In other words, the control unit 14 simulates motions of the non-player character based not on the scenario.

The control unit 14 refers to the game situation data, and determines whether the non-player characters include the non-player characters operating in the imitation mode (S4). That is, in S4, the control unit 14 determines whether the imitation mode is being executed. If it is determined that there are non-player characters operating in the imitation mode (S4; Y), the processing proceeds to S10. In this case, the control unit 14 continues motion control under the imitation mode based on the scenario in use.

On the other hand, if it is determined that there is no non-player characters operating in the imitation mode (S4; N), the control unit 14 calculates the similarity of the situation of the game being executed and situations of respective scenarios in the scenario database (S5). In S5, the control unit 14 compares the parameters stored in the game situation data with the parameters stored in respective scenarios to calculate similarities.

In this embodiment, as described above, the control unit 14 calculates player's situation similarity for each of the non-player characters to be controlled in scenarios. In this regard, methods for calculating player's situation similarity of the non-player characters may be different depending on the current situations of the respective non-player characters. For example, depending on the positional relation of a non-player character and the ball 52 for which player's situation similarity is calculated, the situation in which the ball 52 is far away from the character may be ignored to some extent, or not affect the numerical value of the player's situation similarity. Further, for example, association of non-player characters with calculation methods of player's situation similarity (e.g., type of parameter to be referred to) may be defined in a game program, and the control unit 14 may calculate player's situation similarity based on a calculating method associated with each non-player character. The control unit 14 substitutes player's situation similarity calculated for each non-player character for a given numerical formula so as to calculate similarity. The control unit 14 temporarily records similarity calculated for each scenario in the main memory 16.

The control unit 14 determines whether there is a scenario having similarity calculated in S5 equal to or more than the reference value (S6). The reference value may be a value determined in advance, or changeable according to the game being executed.

If it is determined that there is no scenario having the similarity equal to or more than the reference value (S6; N), the processing proceeds to S13. In this case, since there is no scenario similar to the situation of the game being executed, the non-player characters do not operate in the imitation mode but operate in the simulation mode.

On the other hand, if it is determined that there is a scenario having the similarity equal to or more than the reference value (S6; Y), the control unit 14 obtains the scenario having the similarity equal to or more than the reference value (S7). Here, if there are multiple scenarios having the similarity equal to or more than the reference value, the control unit 14 obtains a scenario having the highest similarity.

The control unit 14 selects a control target in the imitation mode among from the non-player characters of respective teams based on the scenario obtained in S7 (S8). In S8, the control unit 14 selects a non-player character indicated in the scenario (e.g., a non-player character indicated in the scenario and having the same player name as a player in the real world) as the control target in the imitation mode among from the non-player characters of respective teams.

The control unit 14 switches the control of non-player character selected in S8 from the simulation mode to the imitation mode (S9). In S9, the control unit 14 refers to the game situation data, and stores a state that the non-player character selected in S8 is controlled in the imitation mode.

The control unit 14 operates the non-player character of the control target in the imitation mode based on motions stored in the scenario (S10). The detail of the processing in S10 is as described above, and the non-player characters are operated such that a difference between the motion of the player indicate in the scenario and the motion of the non-player characters is less than the reference value.

The control unit 14 determines whether releasing conditions of the imitation mode are satisfied (S11). The releasing conditions are predetermined conditions for determining whether to release the control in the imitation mode currently being executed. For example, the releasing conditions include a condition indicating whether the situation of the game being executed is no longer similar to the situation indicated in the data stored in the scenario, and a condition indicating whether the motion stored in the scenario is finished.

If it is determined that the releasing conditions are satisfied (S11; Y), the control unit 14 switches the control of the non-player character from the imitation mode to the simulation mode (S12). In S12, the control unit 14 refers to the game situation data, and stores a state that the non-player character, which has been controlled in the imitation mode, is now controlled in the imitation mode, and releases the motion control in the imitation mode.

On the other hand, if it is determined that the releasing conditions are not satisfied (S11; N), the processing in S12 is not executed. In this case, the motion control in the imitation mode continues.

The control unit 14 determines whether finishing conditions are satisfied (S13). The finishing conditions may be determined in advance to finish this processing. The finishing conditions include, for example, whether the finishing time of the game has arrived, or whether the user performs a game finishing operation. If it is determined that the finishing conditions are satisfied (S13; Y), this processing is finished. If it is not determined that the finishing conditions are satisfied (S13; N), the processing returns to S2.

According to the game device 10 described above, when a situation of a game being executed is similar to a situation in a scenario, non-player characters are operated based on motions of players in the real world defined in the scenario. Accordingly, accuracy of a simulation regarding movements of players in sports games can be improved. In particular, in a game using the ball 52 as in this embodiment, states of the ball 52 greatly affect the situation of the game. As such, defining how players move with respect to the ball 52 in the scenario can improve the accuracy of motions of the non-player characters with respect to the ball 52.

While the imitation mode is executed, some of the non-player characters operate in the simulation mode, and thus the non-player characters operating in the simulation mode and the non-player character operating in the imitation mode can coexist in the game space 40. Specifically, in the game using the ball 52 as in this embodiment, for example, only the motions of the players relatively close to the ball are defined in the scenario. In this way, the non-player characters relatively far from the ball 52 (i.e., non-player characters having little influence on changes in the situation of the game) can be operated in the simulation mode.

The control target of the imitation mode is selected based on the scenario having high similarity with the situation indicated by the game situation data, and thus it is possible to control only the non-player characters that should be operated based on the motions of actual players in the imitation mode. Specifically, in the game using the ball 52 as in this embodiment, for example, only the motions of the players relatively close to the ball are defined in the scenario. In this way, only the non-player characters having strong influence on changes in the situation of the game can be controlled in the imitation mode.

The scenario database stores a plurality of scenarios, and thus it is possible to perform motion control of the non-player characters by using various scenarios in which motions of actual players are defined.

The scenarios store motions of the characters 54 of the user team and motions of the characters 56 of the opponent team, and thus it is possible to control the motions of the non-player character belonging to the respective teams based on one scenario. Specifically, in the game using the ball 52 as in this embodiment, the motions of respective players are changed in accordance with the motions of the opponent players, and thus it is possible to more effectively improve the accuracy of simulation by defining the motions of players of both teams in the scenario.

The accuracy of simulation of game characters in sports games can be improved by applying the motion control based on scenarios to the games, and thus it is possible to offer games with high reality to users. As such, users can reproduce famous scenes of sports games in the real world, and modify the games so as to have different results from events in sports games in the real world. For example, scenarios define the motions of players in the scenes in real soccer games in which scores are generated, thereby playing games to reproduce such scenes, or playing games not to give scores and to obtain different results from the real world.

[5. Variation]

The present invention is not to be limited to the above described embodiment. The present invention can be changed as appropriate without departing from the spirit of the invention.

Figure 8:
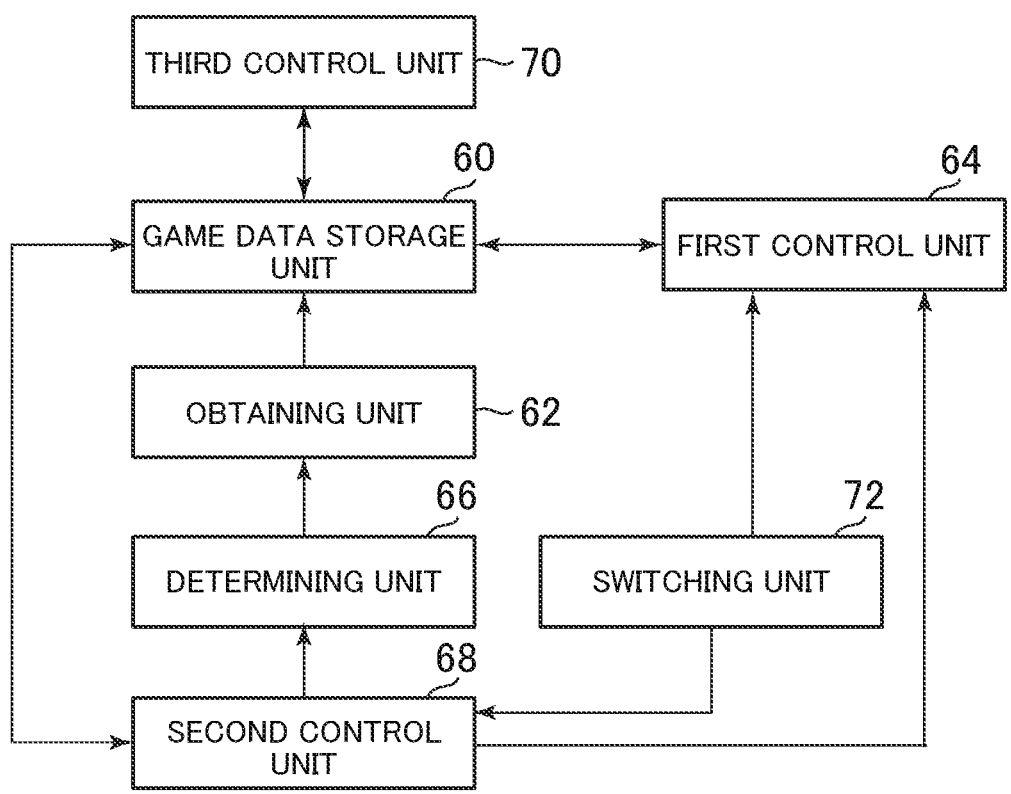
FIG. 8 is a functional block diagram of a variation.

FIG. 8 is a functional block diagram of a variation. As shown in FIG. 8, in the variation described below, a switching unit 72 is implemented in addition to the functions of the embodiment. The switching unit 72 is mainly implemented by the control unit 14. The switching unit 72 may be omitted in the game device 10.

(1) For example, in a case where the imitation mode based on a scenario is executed and the user's operation target behaves quite differently from the scenario being executed, the non-player characters operating in the imitation mode may be returned to be controlled in the simulation mode.

The game device 10 of variation (1) includes the switching unit 72. The switching unit 72 switches the control of the control target of the second control unit 68 from the second control unit 68 to the first control unit 64 based on the motion performed by the user's operation target during the control of the second control unit 68. "During the control of the second control unit 68" means during the imitation mode being executed.

For example, the releasing condition of a scenario in this variation is a condition indicating whether the user's operation target performs a predetermined type of motion. That is, each scenario determines at least one of the motions as a condition for stopping the execution of the imitation mode based on such scenario.

The switching unit 72 determines whether the user's operation target has performed the motion associated with the scenario being executed based on the user's operation. If it is determined that the user's operation target has performed the motion, the switching unit 72 switches the control of the non-player characters of the control target of the second control unit 68 from the imitation mode to the simulation mode.

According to the variation (1), it is possible to perform the most suitable motion control in response to the motion performed by the user's operation target. For example, when the user's operation target performs a motion quite different from a scenario, it is assumed that the user does not wish to execute the scenario. Thus, the control can be switched to the simulation mode, and a more suitable game for the user's preference can be provided.

(2) For example, while the imitation mode based on a scenario is executed, when the situation of the game being executed is no longer similar to the situation indicated in the scenario, the non-player character operating in the imitation mode may be returned to be controlled in the simulation mode.

The determining unit 66 of variation (2) determines whether the situation of the game in the virtual world during the control of the second control unit 68 (e.g., situation of the game being executed) is no longer similar to the situation that is determined to be similar. "Situation that is determined to be similar" is a situation stored in the scenario being executed. The determining method of the determining unit 66 is the same as the method described in the embodiment, and similarities of these situations are calculated to determine whether the similarities are equal to or more than the reference value. That is, during the imitation mode executed, the determining unit 66 calculates the similarity between the situation indicated in the scenario and the situation indicated in the game situation data.

When it is determined that the situation of the game in the virtual world (e.g., situation of the game being executed) is no longer similar to the situation that is determined to be similar (i.e., situation of the scenario being executed), the switching unit 72 switches the control of the control target of the second control unit 68 from the second control unit 68 to the first control unit 64. "Situation is no longer similar" means that the similarity calculated by the determining unit 66 is changed from the state equal to or more than the reference value to the state less than the reference value. If it is determined that the similarity is less than the reference value, the switching unit 72 switches the control of the non-player characters of the control target of the second control unit 68 from the imitation mode to the simulation mode.

According to the variation (2), it is possible to perform the most suitable motion control in response to the situation of the game being simulated. In particular, the non-player characters operating in the imitation and the non-player character operating in the simulation mode coexist in the game described above, and thus sometimes the situation is no longer similar to the situation indicated in the scenario depending on the progress of the game. In this case, once the situation of the game is no longer similar, accuracy of the simulation cannot be improved even though the non-player characters are controlled based on the scenario. As such, by releasing the imitation mode, the most suitable motion control according to the progress of the game can be provided to the user.

(3) For example, while the imitation mode based on a scenario is executed, when the situation of the game being executed is no longer similar to the situation stored in the scenario, the non-player characters operating in the imitation mode may be switched to be controlled in the imitation mode based on another scenario.

When it is determined that the situation of the game in the virtual world (e.g., situation of the game being executed) is no longer similar to the situation that has been determined to be similar (e.g., situation indicated in the scenario being executed), the second control unit 68 of the variation (3) switches the control from being based on the scenario corresponding to the situation that is determined to be not similar to being based on another scenario. "Another scenario" is a scenario other than the scenario being executed, for example, a scenario having similarity equal to or more than the reference value and other than the scenario being executed.

If the situation indicated in the scenario being executed is no longer similar to the situation indicated in the game situation data, the second control unit 68 stops the execution of the imitation mode based on the scenario being executed, and executes the imitation mode based on another scenario. For example, in a case where the non-player characters operating in the imitation mode based on the scenario being executed are selected to be controlled in the imitation mode based on another scenario, the second control unit 68 switches the control of the non-player characters from the imitation mode based on the scenario being executed to the imitation mode based on another scenario.

According to variation (3), it is possible to perform the motion control according to motions of actual players based on the most suitable scenario in response to the situation of the game being simulated. In particular, in the game described in the embodiment, the situation of the game may be greatly changed while the imitation mode is executed based on the scenario. In this case, accuracy of the simulation can be more effectively improved by switching the scenario to a scenario that is more suitable for the current situation.

(4) For example, in a case where the imitation mode based on a scenario is executed and the user's operation target behaves quite differently from the scenario, the non-player characters operating in the imitation mode may be switched to be controlled in the simulation mode based on another scenario.

The second control unit 68 switches from the control based on the scenario corresponding to the situation that has been determined to be similar (e.g., scenario being executed) to the control based on another scenario (e.g., scenario other than the scenario being executed), based on the motion performed by the user's operation target during the control of the second control unit 68.

Similarly to the variation (1), each scenario is associated with a type of motion in the variation (4). The second control unit 68 determines whether the user's operation target has performed the motion associated with the scenario being executed. When the user's operation target performs the motion associated with the scenario being executed, the second control unit 68 switches to the imitation mode based on another scenario. Similarly to the variation (3), also in the variation (4), the second control unit 68 may select the scenario to use after switching the mode among from scenarios having the similarity to the situation indicated in the game situation data equal to or more than the reference value.

According to the variation (4), the motion control of the non-player characters can be performed by switching the scenario to the most suitable scenario to the situation of the game being simulated. For example, when the user's operation target performs the motion quite differently from the scenario, the control can be switched to be performed under another scenario assuming that the user does not wish to execute the current scenario. As such, a more suitable scenario for the user's preference can be provided.

(5) In the embodiment, for simplicity of explanation, when the imitation mode is executed under a scenario, the imitation mode under another scenario is not executed. However, the imitation modes based on respective scenarios may be executed simultaneously. That is, the non-player characters may respectively operate in a plurality types of imitation modes based on different scenarios.

When it is determined that the situation of the game in the virtual world (e.g., situation of the game being executed) is similar to some of the situations indicated in the scenarios, the second control unit 68 operates some of the virtual players other than the user's operation target (e.g., some of the non-player characters) based on the motion associated with one situation of the situations that are determined to be similar, and operates the virtual players other than the some of the virtual players based on the motion associated with another situation.

In a case where there are a plurality of scenarios having the similarity equal to or more than the reference value, the second control unit 68 executes the imitation mode for each of the scenarios. That is, the second control unit 68 operates a plurality of non-player characters based on a plurality of scenarios. For example, based on a scenario having the highest similarity, the second control unit 68 selects a control target in the imitation mode based on such scenario. Then, based on a scenario having the second highest similarity, the second control unit 68 selects a control target in the imitation mode based on such scenario from the non-player characters that are not yet selected as the control target in the imitation mode.

Subsequently, the second control unit 68 continues to select a control target in the imitation mode based on the scenarios in the order of high similarity, until there is no scenario having the similarity equal to or more than the reference value or there is no non-player character that is not selected as the control target. The second control unit 68 operates the selected non-player characters based on the motions stored in respective scenarios.

According to the variation (5), a plurality of scenarios are used simultaneously in response to the situation of the game being simulated, thereby controlling the motions of respective non-player characters. As such, for example, a group of non-player characters is operated based on a scenario, and another group is operated based on another scenario, and thus it is possible to improve accuracy of the simulation more effectively.

The method for controlling a plurality of non-player characters at the same time based on a plurality of scenarios is not limited to the above example. For example, a non-player character may be controlled based on a scenario having the highest player's situation similarity corresponding to the non-player character. Alternatively, for example, a non-player character may be controlled based on a scenario corresponding to a scenario for controlling other non-player characters.

(6) For example, in the above description, a case is explained where the non-player characters operate based on scenarios, although the user's operation target may operate based on scenarios. In this case, operations of the user may be modified so as to approximate the motion of the user's operation target to the motion indicated in the scenario.

When it is determined that the situation of the game in the virtual world (e.g., situation of the game being executed) is similar to the situation indicated in the scenario, the third control unit 70 operates the user's operation target based on the motion associated with the situation and the user's operation. In the variation (6), the second control unit 68 selects the user's operation target as the control target in the imitation mode. That is, the motions defined in the scenario include information indicating the character 54 set as the user's operation target.

Figure 9:
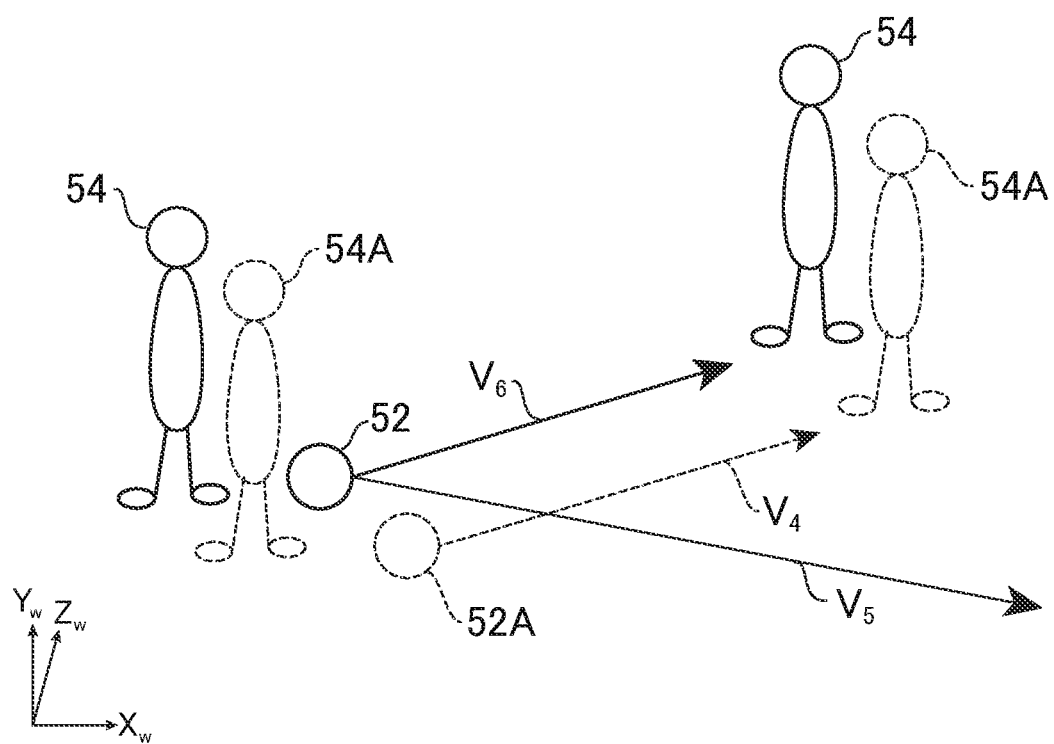
FIG. 9 is a diagram explaining content of control by a first control unit in variation (6).

FIG. 9 is a diagram for explaining control of the third control unit 70 in the variation (6). The third control unit 70 changes motions of the user's operation target so that a difference between a motion corresponding to the user's operation and a motion defined in a scenario is smaller. The difference between the motions is the same as described in the embodiment. For example, as shown in FIG. 9, when a scenario defines that the user's operation target moves the ball 52 in a predetermined direction $V_4$, third control unit 70 modifies the motion of the user's operation target and causes the ball 52 to move to the moving direction $V_6$ so that the moving direction $V_5$ of the ball 52 indicated by the user approaches to the moving direction $V_4$ of the ball 52 defined in the scenario.

According to the variation (6), the motion of the user's operation target may be controlled based on a motion of a player in the real world. As such, the user can easily reproduce the event of the game in the real world indicated in the scenario.

(7) For example, the modification described in the variation (6) may be performed only when a difference between the motion corresponding to the operation indicated by the user and the motion defined in the scenario is relatively large.

When it is determined that the situation of the game in the virtual world (e.g., situation of the game being executed) is similar to the situation indicated in the scenario, the third control unit 70 obtains a difference between the motion associated with the situation and the motion corresponding to the operation of the user. The difference between the motions is the same as described in the embodiment. For example, the third control unit 70 obtains a difference between a position or a moving direction of a character 54 indicated by the motion stored in the scenario and a position or a moving direction of a character 54 corresponding to the operation of the user. Further, for example, the third control unit 70 obtains a difference between a position or a moving direction of the ball 52 indicated by the motion stored in the scenario and a position or a moving direction of the ball 52 moved by the operation target in response to the user's operation.

When the obtained difference is equal to or more than the reference value, the third control unit 70 operates the user's operation target based on the motion associated with the similar situation and the user's operation. This control method is the same as the variation (6). That is, when the obtained difference is less than the reference value, the third control unit 70 operates the user's operation target based not on the motion stored in the scenario, but on the user's operation.

According to the variation (7), in a case where a difference between a motion of a player in the real world and a motion corresponding to an operation performed by the user is relatively large, the motion of the user' operation target can be controlled based on the motion of the player in the real world. For example, if the motion of the user's operation target is constantly modified to approximate the motion in the scenario, the user may possibly lose the operation feeling of the operation target. However, when the difference is relatively small, it is highly likely that the scenario can be reproduced even though the operation target is operated as the user operates. As such, by not modifying the motion of the user's operation target to approximate the motion in the scenario, it is possible to reduce the possibility that the user lose the operation feeling.

(8) Further, for example, the embodiment and two or more of the variations may be combined.

For example, in the above description, a case is explained where a plurality of non-player characters operate based on a plurality of scenarios, although one non-player character may operate based on one scenario. In this case, a scenario includes information about one character 54 (56) that should be operated based on such scenario. The determining unit 66 calculates similarity based on the situation indicated by the scenario and the current states of the one character 54 (56), and the second control unit 68 controls the one character 54 (56) based on the scenario when the similarity is equal to or more than the reference value.

The foregoing description describes a case in which a scenario to be used in the imitation mode is specified based on the similarity calculated by, for example, taking a weighted sum of player's situation similarities, although the method for specifying the scenario is not limited to this. A scenario similar to the situation indicated by the game situation data may be specified as a target to use. Other than this, for example, the determining unit 66 may calculate similarity regarding overall situation of the game (e.g., similarity regarding the game status such as score difference) without calculating the player's situation similarities, and specify the scenario to use by calculating the player's situation similarity using scenarios having relatively high similarity. Further, for example, the method for searching scenarios to be used in the imitation mode may change according to how many non-player characters are controlled by one scenario, or whether a lot of scenarios can be executed at the same time.

For example, when the second control unit 68 performs motion control based on a scenario, it is not necessary to make the non-player characters sequentially perform motions from the first motion defined in the scenario, but the second control unit 68 may make the non-player characters perform a motion defined in the middle of the scenario.

For example, parameters included in scenarios are not limited to the above example. Each scenario may store parameters regarding players in games in the real world. Alternatively, for example, each scenario may store parameters indicating emotion values and degree of fatigue of respective players in the games in the real world. In this case, parameters corresponding such parameters are stored in the game situation data. The determining unit 66 determines whether the situations are similar by comparing the emotion values and degree of fatigue of the non-player characters with the emotion values and degree of fatigue of player indicated in the scenario.

The foregoing description describes the example in which, for example, each scenario stores motions of players in games in the real world on a time series, although only motions performed by the players at a certain timing may be stored.

In the above example, the case is explained in which, for example, one of the characters 54 is set as the user' operation target, although the user's operation target may not be necessarily set. That is, all of the character 54 (56) placed on the game space 40 may be controlled by the first control unit 66 or the second control unit 68.

The game space 40 has been described as the three-dimensional space as shown in FIG. 2, for example, although the game space according to the present invention may be a two-dimensional game space in which positions or the like of the characters 54 (56) and the ball 52 may be managed by the two coordinate elements.

In the above description, a stand-alone type game has been mainly discussed as an example, although the present invention may be applied to various games, such as an on-line type game using social networks (e.g., so-called browser type game and native application type game). In this case, a server connected to a terminal operated by the user may correspond to a game device according to the present invention.

The present invention can be applied to any sports games in addition to a soccer game (e.g. basketball, ice hockey, and American football games). Further, for example, the present invention can be applied to a simulation device other than a game device. The techniques of the present invention can also be applied to, for example, a device for performing a simulation so as to support training of athletes in the real world.

[6. Outline of the Invention]

The present invention is summarized as follows, for example, based on the foregoing descriptions.

A simulation device (10) according to the present invention that simulates a motion of a player in a sports game (e.g., soccer) includes first control means (64) for simulating a motion of a virtual player (e.g., characters 54) that is one of a plurality of virtual players placed in a virtual world (e.g., game space 40) and other than an operation target of a user, obtaining means (62) for obtaining content stored in storing means (60) that stores data associating a situation of the sports game performed in a real world with a motion of an actual player in the game, determining means (66) for determining whether a situation of a game being simulated in the virtual world and the situation indicated in the data are similar to each other, and second control means (68) for controlling the virtual player other than the operation target of the user, in a case where it is determined that the situation of the game in the virtual world and the situation indicated in the data are similar to each other, in place of the first control means (64) based on the motion associated with the situation.

A simulation method according to the present invention for simulating a motion of a player in a sports game (e.g., soccer) includes a first control step (64) for simulating a motion of a virtual player (e.g., characters 54) that is one of a plurality of virtual players placed in a virtual world and other than an operation target of a user, a step (62) for obtaining content stored in storing means (60) that stores data associating a situation of the sports game performed in a real world with a motion of an actual player in the game, a determining step (66) for determining whether a situation of a game being simulated in the virtual world and the situation indicated in the data are similar to each other, and a second control step (68) for controlling the virtual player other than the operation target of the user, in a case where it is determined that the situation of the game in the virtual world and the situation indicated in the data are similar to each other, in place of the first control step (64) based on the motion associated with the situation.

A program according to the present invention for causing a computer (10) that simulates a motion of a player in a sports game (e.g., soccer) to function as first control means (64) for simulating a motion of a virtual player (e.g., characters 54) that is one of a plurality of virtual players placed in a virtual world (e.g., game space 40) and other than an operation target of a user, obtaining means (62) for obtaining content stored in storing means (60) that stores data associating a situation of the sports game performed in a real world with a motion of an actual player in the game, determining means (66) for determining whether a situation of a game being simulated in the virtual world and the situation indicated in the data are similar to each other, and second control means (68) for controlling the virtual player other than the operation target of the user, in a case where it is determined that the situation of the game in the virtual world and the situation indicated in the data are similar to each other, in place of the first control means (64) based on the motion associated with the situation.

An information storage medium according to the present invention is a computer-readable information storage medium for storing the program.

According to the present invention, it is possible to improve accuracy of a simulation regarding a motion of a player in a sports game.

In one embodiment of the present invention, a plurality of virtual players (e.g., characters 54) other than the operation target of the user are placed in the virtual world (e.g., game space 40). In a case where it is determined that the situation of the game in the virtual world and the situation indicated in the data are similar to each other, the second control means (68) controls some of the plurality of virtual players other than the operation target of the user in place of the first control means (64) based on the motion associated with the situation. In a case where it is determined that the situation of the game in the virtual world and the situation indicated in the data are similar to each other, the first control means (64) controls the plurality of virtual players other than the operation target of the user and a control target of the second control means (68). According to this embodiment, the virtual players controlled by the first control means and the virtual players controlled by the second control means can coexist in the virtual world.

In one embodiment of the present invention, the second control means (68) includes means (68) for selecting, in a case where it is determined that the situation of the game in the virtual world (e.g., game space 40) and the situation indicated in the data are similar to each other, the control target of the second control means (68) among from the plurality of virtual players (e.g., characters 54) other than the operation target of the user based on the data, and controls the selected virtual player in place of the first control means (64). According to this embodiment, only the virtual players that should be operated based on the motion of the actual player can be controlled by the second control means.

In one embodiment of the present invention, the simulation device (10) includes means (72) for switching the control target of the second control means (68) from being controlled by the second control means (68) to being controlled by the first control means (64) based on the motion performed by the operation target of the user during the control of the second control means (68). According to this embodiment, it is possible to perform the most suitable motion control in response to the motion performed by the operation target of the user.

In one embodiment of the present invention, the determining means (66) determines whether the situation of the game in the virtual world (e.g., game space 40) during the control of the second control means (68) is no longer similar to the situation that has been determined to be similar. The simulation device (10) further includes means (72) for switching the control target of the second control means (68) from being controlled by the second control means (68) to being controlled by the first control means (64), in a case where it is determined that the situation of the game in the virtual world is no longer similar to the situation that has been determined to be similar. According to this embodiment, it is possible to perform the most suitable motion control in response to the situation of the game being simulated.

In one embodiment of the present invention, the storing means (60) stores the data that includes a plurality of data items, and the determining means (66) determines whether the situation of the game in the virtual world (e.g., game space 40) is similar to each of situations respectively indicated in the plurality of data items. In a case where it is determined that the situation of the game in the virtual world is similar to a situation indicated by at least one of the plurality of data items, the second control means (68) controls the virtual player (e.g., characters 54) other than the operation target of the user based on a motion associated with the situation that has been determined to be similar. According to this embodiment, it is possible to perform a simulation by using various data items in which motions of actual players are defined.

In one embodiment of the present invention, the determining means (66) determines whether the situation of the game in the virtual world (e.g., game space 40) during the control of the second control means (68) is no longer similar to the situation that has been determined to be similar. In a case where it is determined that the situation of the game in the virtual world is no longer similar to the situation that has been determined to be similar, the second control means (68) switches the control from being based on a data item corresponding to the situation that is determined to be not similar to being based on another data item. According to this embodiment, it is possible to perform the motion control based on the motions of the actual players, based on the most suitable data in response to the situation of the game being simulated.

In one embodiment of the present invention, the second control means (68) switches the control from being based on the data item corresponding to the situation that has been determined to be similar to being based on the motion indicated in the another data item based on the motion performed by the operation target of the user during the control of the second control means (68). According to this embodiment, the motion control of the virtual players (e.g., characters 54) can be performed by switching the data to the most suitable data to the situation of the game being simulated.

In one embodiment of the present invention, in a case where it is determined that the situation of the game in the virtual world (e.g., game space 40) is similar to a plurality of situations indicated by some of the data items, the second control means (68) operates some of the virtual players (e.g., characters 54) other than the operation target of the user based on a motion associated with one situation among from the plurality of situations that have been determined to be similar, and operates other virtual players other than the some of the virtual players (e.g., characters 54) based on the motion associated with another situation. According to this embodiment, it is possible to perform the motion control of the respective virtual players (e.g., characters 54) by using a plurality of data items simultaneously in response to the situation of the game being simulated.

In one embodiment of the present invention, the simulation device further includes the third control means (70) for operating the operation target of the user based on an operation of the user, and, in a case where it is determined that the situation of the game in the virtual world (e.g., game space 40) is similar to the situation indicated in the data, operating the operation target of the user based on a motion associated with the situation and the operation of the user. According to this embodiment, it is possible to control the motion of the operation target of the user based on the motion of the player in the real world.

In one embodiment of the present invention, the third control means (70) further includes means (70) for obtaining, in a case where it is determined that the situation of the game in the virtual world (e.g., game space 40) is similar to the situation indicated in the data, a difference between a motion associated with the situation and a motion corresponding to the operation of the user, and, in a case where the obtained difference is equal to or more than a reference value, operating the operation target of the user based on the motion associated with the situation and the operation of the user. According to this embodiment, in a case where the difference between the motion of the player in the real world and the motion corresponding to the operation of the user is relatively large, the motion of the operation target of the user can be controlled based on the motion of the player in the real world.

In one embodiment of the present invention, the simulation device (10) simulates a motion of a player in a sports game (e.g., soccer) in which a plurality of teams compete, and each of the plurality of virtual players (e.g., characters 54) belongs to one of the plurality of teams. The first control means (64) simulates the motion of the virtual player that is other than the operation target of the user and respectively belong to the plurality of teams, and the data indicates motions of the respective players of the plurality of teams in the game performed in the real world. In a case where it is determined that the situation of the game in the virtual world (e.g., game space 40) is similar to the situation indicated in the data, the second control means (68) controls the virtual players respectively belonging to the plurality of teams based on a motion associated with the situation. According to this embodiment, the motions of the virtual players respectively belonging to the teams can be controlled based on one data item.

In one embodiment of the present invention, the simulation device (10) executes a game in which a motion of a player in a sports game (e.g., soccer) is simulated. Each of the plurality of virtual players is a game character (e.g., character 54). The first control means (64) simulates the motion of the game character other than the operation target of the user, and the second control means (68) controls the game character other than the operation target of the user based on the motion associated with the situation that has been determined to be similar. According to this embodiment, it is possible to improve accuracy of a simulation of a game character imitating a sports player.

The invention claimed is:

1. A simulation device that simulates a motion of a player in a sports game, comprising at least one microprocessor configured to:
   simulate a motion of a controlled virtual player that is one of a plurality of virtual players placed in a virtual world, where the controlled virtual player is different from a target being operated by a user;
   obtain content stored in a memory that stores data which associates a situation of the sports game performed in a real world with a motion of an actual player in the game;
   determine whether a situation in a simulated game in the virtual world and the situation indicated in the data are similar to each other; and
   cause the controlled virtual player, in a case where the situation of the game in the virtual world and the specific situation indicated in the data are similar to each other, to imitate the motion associated with the specific situation in place of the simulation.

2. The simulation device according to claim 1, wherein a plurality of controlled virtual players are placed in the virtual world,
   wherein the at least one microprocessor causes some of the plurality of controlled virtual players, in a case where the situation of the game in the virtual world and the specific situation indicated in the data are similar to each other, to imitate the motion associated with the specific situation in place of the simulation, and
   simulates other controlled virtual players in a case where the situation of the game in the virtual world and the specific situation indicated in the data are similar to each other.

3. The simulation device according to claim 2,
   wherein the at least one microprocessor selects, in a case where the situation of the game in the virtual world and the specific situation indicated in the data are similar to each other, the imitation target from among the plurality of controlled virtual players, and
   causes the selected controlled virtual player to imitate the motion associated with the specific situation in place of the simulation.

4. The simulation device according to claim 1
   wherein the at least one microprocessor switches the imitation target to being simulated based on the motion performed by the target being operated by the user during the control.

5. The simulation device according to claim 1,
   wherein the at least one microprocessor determines whether the situation of the game in the virtual world during the imitation is no longer similar to the situation that has previously been determined to be similar, and
   switches the imitation target to being simulated in a case where the situation of the game in the virtual world is no longer similar to the situation that has previously been determined to be similar.

6. The simulation device according to claim 1,
   wherein the memory stores the data that includes a plurality of data items,
   wherein the at least one microprocessor determines whether the situation of the game in the virtual world is similar to each of situations respectively indicated in the plurality of data items, and
   causes the controlled virtual player, in a case where the situation of the game in the virtual world is similar to a specific situation indicated by at least one of the plurality of data items, to imitate a motion associated with the specific situation that has been determined to be similar.

7. The simulation device according to claim 6,
   wherein the at least one microprocessor determines whether the situation of the game in the virtual world during the imitation is no longer similar to the situation that has previously been determined to be similar, and
   switches, in a case where the situation of the game in the virtual world is no longer similar to the situation that has previously been determined to be similar, the imitation from being based on a data item corresponding to the situation that is determined to be not similar to being based on another data item.

8. The simulation device according to claim 6,
   wherein the at least one microprocessor switches the imitation from being based on the data item corresponding to the situation that has been determined to be similar to being based on the motion indicated in the another data item based on the motion performed by the target being operated by the user during the imitation.

9. The simulation device according to claim 6, wherein the at least one microprocessor causes some of controlled virtual players, in a case where the situation of the game in the virtual world is similar to a plurality of situations indicated by some of the data items, to a motion associated with one situation from among the plurality of situations that have been determined to be similar, and causes other controlled virtual players to a motion associated with another situation.

10. The simulation device according to claim 1, wherein the at least one microprocessor operates the target being operated by the user, and operates, in a case where the situation of the game in the virtual world is similar to the specific situation indicated in the data, the target being operated by the user based on a motion associated with the specific situation and the operation of the user.

11. The simulation device according to claim 10, wherein the at least one microprocessor obtains, in a case where the situation of the game in the virtual world is similar to the specific situation indicated in the data, a difference between a motion associated with the specific situation and a motion corresponding to the operation of the user, and operates, in a case where the obtained difference is equal to or more than a reference value, the target being operated by the user based on the motion associated with the specific situation and the operation of the user.

12. The simulation device according to claim 1, wherein the simulation device simulates motions of a plurality of players in a sports game in which a plurality of teams compete, wherein each of the plurality of virtual players belongs to one of the plurality of teams, wherein the data indicates motions of the respective players of the plurality of teams in the game performed in the real world, wherein the at least one microprocessor simulates the motion of the controlled virtual player belongs to the term, and causes, in a case where the situation of the game in the virtual world is similar to the specific situation indicated in the data, the controlled virtual player belonging to the term to imitate a motion associated with the specific situation.

13. The simulation device according to claim 1, wherein the simulation device executes a game in which a motion of a player in a sports game is simulated, wherein each of the plurality of virtual players is a game character, wherein the at least one microprocessor simulates the motion of the controlled game character, and causes the controlled game character to imitate the motion associated with the situation that has been determined to be similar.

14. A simulation method for simulating a motion of a player in a sports game, comprising:
simulating a motion of a controlled virtual player that is one of a plurality of virtual players placed in a virtual world, where the controlled virtual player is different from a target being operated by a user;
obtaining content stored in a memory that stores data which associates a situation of the sports game performed in a real world with a motion of an actual player in the game;
determining whether a situation in a simulated game in the virtual world and the situation indicated in the data are similar to each other; and
causing the controlled virtual player, in a case where the situation of the game in the virtual world and the specific situation indicated in the data are similar to each other, to imitate the motion associated with the specific situation in place of the simulation.

15. A non-transitory computer-readable information storage medium that stores a program for causing a computer that simulates a motion of a player in a sports game, to perform a function of:
simulating a motion of a controlled virtual player that is one of a plurality of virtual players placed in a virtual world, where the controlled virtual player is different from a target being operated by a user;
obtaining content stored in a memory that stores data which associates a situation of the sports game performed in a real world with a motion of an actual player in the game;
determining whether a situation in a simulated game in the virtual world and the specific situation indicated in the data are similar to each other; and
causing the controlled virtual player, in a case where the situation of the game in the virtual world and the specific situation indicated in the data are similar to each other, to imitate the motion associated with the specific situation in place of the simulation.

* * * * *